United States Patent
Liu et al.

(10) Patent No.: US 11,908,100 B2
(45) Date of Patent: Feb. 20, 2024

(54) TRANSFORM MATRIX LEARNING FOR MULTI-SENSOR IMAGE CAPTURE DEVICES

(71) Applicant: QUALCOMM Incorporated, San Diego, CA (US)

(72) Inventors: Shizhong Liu, San Diego, CA (US); Jincheng Huang, San Diego, CA (US); Weiliang Liu, San Diego, CA (US); Jianfeng Ren, San Diego, CA (US); Sahul Madanayakanahalli Phaniraj Venkatesh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/201,660

(22) Filed: Mar. 15, 2021

(65) Prior Publication Data
US 2022/0292630 A1    Sep. 15, 2022

(51) Int. Cl.
*G06T 3/00* (2006.01)
*G06T 7/521* (2017.01)
(Continued)

(52) U.S. Cl.
CPC .......... *G06T 3/0093* (2013.01); *G06T 3/0012* (2013.01); *G06T 5/50* (2013.01);
(Continued)

(58) Field of Classification Search
CPC ....... G06T 3/0093; G06T 3/0012; G06T 5/50; G06T 7/521; G06T 7/571;
(Continued)

(56) References Cited

U.S. PATENT DOCUMENTS

| | | | |
|---|---|---|---|
| 2008/0219655 A1* | 9/2008 | Yoon | H04N 23/673 396/89 |
| 2013/0176388 A1* | 7/2013 | Boisson | H04N 13/122 348/E13.064 |

(Continued)

FOREIGN PATENT DOCUMENTS

EP    2911392 A1    8/2015

OTHER PUBLICATIONS

International Search Report and Written Opinion—PCT/US2022/070948—ISA/EPO—dated Sep. 9, 2022.
(Continued)

*Primary Examiner* — Chan S Park
*Assistant Examiner* — Daniel C Chang
(74) *Attorney, Agent, or Firm* — QUALCOMM Incorporated

(57) ABSTRACT

Artefacts in a sequence of image frames may be reduced or eliminated through modification of an input image frame to match another image frame in the sequence, such as by geometrically warping to generate a corrected image frame with a field of view matched to another frame in sequence of frames with the image frame. The warping may be performed based on a model generated from data regarding the multi-sensor device. The disparity between image frames may be modeled based on image captures from the first and second image sensor for scenes at varying depths. The model may be used to predict disparity values for captured images, and those predicted disparity values used to reduce artefacts resulting from image sensor switching. The predicted disparity values may be used in image conditions resulting in erroneous actual disparity values.

53 Claims, 5 Drawing Sheets

(51) Int. Cl.
*G06T 7/571* (2017.01)
*G06T 5/50* (2006.01)
*H04N 5/268* (2006.01)
*H04N 23/90* (2023.01)

(52) U.S. Cl.
CPC .............. *G06T 7/521* (2017.01); *G06T 7/571* (2017.01); *H04N 5/268* (2013.01); *H04N 23/90* (2023.01); *G06T 2207/10016* (2013.01); *G06T 2207/10028* (2013.01)

(58) Field of Classification Search
CPC . G06T 2207/10016; G06T 2207/10028; G06T 7/55; G06T 2207/10024; G06T 2207/20076; G06T 2207/20081; G06T 2207/20084; G06T 2207/20208; G06T 5/006; H04N 5/247; H04N 5/268; H04N 23/90

See application file for complete search history.

(56) References Cited

U.S. PATENT DOCUMENTS

| | | | |
|---|---|---|---|
| 2020/0302682 A1* | 9/2020 | Aksoy | G06T 19/006 |
| 2021/0248769 A1* | 8/2021 | Luo | G06T 7/593 |
| 2022/0046219 A1* | 2/2022 | Obla | H04N 5/2226 |
| 2022/0067881 A1* | 3/2022 | Li | G06T 3/00 |
| 2022/0357153 A1* | 11/2022 | Konishi | G01B 11/24 |

OTHER PUBLICATIONS

Palaniappan K., et al., "Robust Stereo Analysis", Computer Vision, 1995. Proceedings, International Symposium on TIA—Coralgables, Los Alamitos, CA, USA, IEEE Comput. Soc, US, Nov. 21, 1995, pp. 175-181, XP010151074, DOI: 10.1109/ISCV.1995.476997 ISBN: 978-0-8186-7190-6 abstract, p. 175, col. 1, section 1-p. 177, col. 1, paragraph 1 p. 179, col. 2, paragraph 2.

* cited by examiner

TRANSFORM MATRIX LEARNING FOR MULTI-SENSOR IMAGE CAPTURE DEVICES

FIELD OF DISCLOSURE

Aspects of the present disclosure relate generally to image processing. Some features of the disclosure may enable and provide improvements in the processing of images obtained from multi-sensor image capture devices.

BACKGROUND

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Some image capture devices include multiple image sensors that capture image data through one or more lenses, such devices referred to as multi-sensor image capture devices or multi-sensor devices. The multiple image sensors may be configured with different lenses to provide multiple fields of view of a scene and/or different zoom levels of the scene. Example lens types include wide-angle lenses, ultra-wide-angle lenses, telephoto lenses, telescope lenses, periscope-style zoom lenses, fisheye lenses, macro lenses, prime lenses, or various combinations thereof. In one example, a dual camera configuration may include both a wide lens and a telephoto lens.

However, the use of multiple image sensors increases the complexity of image processing in the device because users generally are not interested in multiple images of the scene, but rather are interested in capturing and displaying a single image. The multiple frames captured from the multiple image sensors may thus be processed to generate a single image for the user. Further, due to different physical characteristics between the image sensors, frames obtained from each image sensor may, nevertheless, flow together in such a way that a transition from one image sensor to another image sensor is perceptible to the human eye. For example, a change from a telephoto lens to wide angle lens during the capturing of a series of image frames for display as a video may result in the appearance of a scene shift in the video. Artifacts such as the scene shift in the output of the multi-sensor image capture device are undesirable.

BRIEF SUMMARY OF SOME EXAMPLES

Artefacts in the video frames result in disruptions in the continuity of image frames output from a multi-sensor device due to switching from one image sensor to another image sensor with a different field of view. The artefacts may be reduced or eliminated through modification of an input image frame to match another image frame. For example, the input frame may be geometrically warped by stretching, shrinking, cropping, and/or otherwise modified to generate a corrected image frame with a field of view matched to another frame in a sequence of frames with the image frame. The image frame modification may be performed based on a model generated from data regarding the multi-sensor device.

The warping may be based on a shift between fields of view from a first image sensor to a second image sensor, referred to as disparity. The disparity may be modeled based on image captures from the first and second image sensor for scenes at varying depths. The model may be used to predict disparity values for captured images, and those predicted disparity values used to reduce artefacts resulting from image sensor switching. The predicted disparity values may be used in image conditions resulting in erroneous actual disparity values. For example, if actual disparity values are determined to be unavailable or erroneous, the predicted disparity values may be substituted for actual disparity values. This substitution may reduce artefacts due to image sensor switching and/or failures in other components associated with image capture such as computer vision processing (CVP). The predicted disparity values determined from the model may facilitate switching image sensors at any zoom ratio and for any scene because in conditions in which actual disparity determinations may fail the predicted disparity values are available.

In some aspects, a single model may be used to model disparity for all image sensors. In some aspects, a separate model may be used for each pair of image frames captured from two image sensors. For example, on a device with three image sensors, a first model may be determined corresponding to the first and second image sensors, a second model may be determined the first and third image sensors, and a third model may be determined for the second and third image sensors. Thus, a switch from any one image sensor to any of the other image sensors may have predicted disparity values available for warping image frames from one image sensor to match the other image sensor.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In general, this disclosure describes image processing techniques involving digital cameras having image sensors and image signal processors (ISPs). In order to achieve improved image quality from reduced artefacts during image sensor switching, the ISP may warp image frames received from an image sensor using a disparity model. The warping and disparity modeling may alternatively be performed on image frames stored apart from the image sensor. The warping and disparity modeling may be performed based on a request from another component in the device, such as by the CPU in response to image processing functions executing on the CPU.

The image signal processor may be configured to control the capture of image frames from one or more image sensors and process the image frames from one or more image sensors to generate a view of a scene in a corrected image frame. In an example, the image signal processor may receive an instruction to capture a sequence of image frames in response to the loading of software, such as a camera application, on the CPU. The image signal processor may be configured to produce a single flow of output frames, based on respective corrected images from the image sensors. The single flow of output frames may include image frames that contain image data from an image sensor that have been corrected, such as by geometric warping, to match the image frame to other image frames in the output flow (e.g., previous frames captured by a different image sensor).

After an output frame representing the scene is generated by the image signal processor, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization, producing a video file via the output frames, configuring frames for display, configuring frames for storage, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have reduced artefacts due to image sensor changes. In an example, the image signal processor may receive input to change zoom levels based on pinch-to-zoom operations, gesture detections, or other user input to the device comprising the image sensors or a user device coupled to the device comprising the image sensors. As the image sensor changes in response to user input, such as a pinch-to-zoom operation, the predicted disparity may be used to warp image frames and reduce artefacts in the sequence of image frames output from the sensors.

In one aspect of the disclosure, a method includes receiving a first disparity value indicating a difference in field of view between a first image sensor and a second image sensor; receiving a first depth value corresponding to the first disparity value; determining a model for a disparity between the first image sensor and the second image sensor at a plurality of depth values, the model based, at least in part, on the first disparity value and the first depth; receiving an input image frame from one of the first image sensor or the second image sensor; receiving an input image depth corresponding to the input image frame; determining a predicted disparity value corresponding to the input image depth based, at least in part, on the model; and/or determining a corrected image frame based, at least in part, on the input image frame and the predicted disparity value. The corrected image frame may be determined based on the predicted disparity value as warped to match a field of view of the other of the first image sensor or the second image sensor. The predicted disparity value may include values for two or more axis, such that the first disparity value indicates a difference in field of view along a first axis, and the method further includes receiving a second disparity value indicating a difference in field of view between the first image sensor and the second image sensor along a second axis different from the first axis, wherein the step of determining the model is further based, at least in part, on the second disparity value. The depth value for training the model may be obtained from an auto-focus system, a range imaging system, or other system. For example, in the method operations, the first depth value comprises an auto-focus depth corresponding to a first input image frame captured by the first image sensor. As another example, the method may include determining the first depth value based on range imaging. In some aspects, the determining the first depth value comprises determining the first depth value based on a time of flight (ToF) measurement. In some aspects, the determining the first depth value comprises determining the first depth value based on a light detection and ranging (LIDAR) measurement.

In some aspects, the determining of the corrected image may be include determining a transformation matrix for warping the input image frame to a field of view of the other of the first image sensor or the second image sensor, such as may be generated through computer vision processing. The determination of the transformation matrix may include determining whether a confidence level associated with the transformation matrix is below a threshold level, and the confidence level used for determining whether to use an actual disparity value determined by the computer vision processing or a predicted disparity value based on a model. For example, the step of determining the corrected image frame may be based, at least in part, on the input image frame and the predicted disparity value is performed based on determining the confidence level of the transformation matrix is below the threshold level. Determination as to whether the actual or predicted disparity values may also or alternatively be based on other image characteristics. For example, the method may include determining an image characteristic of the input image frame is below a threshold level, wherein the step of determining the corrected image frame based, at least in part, on the input image frame and the predicted disparity value is performed based on determining the image characteristic is below the threshold level. In some aspects, the image characteristic may be a brightness level, such that the method includes determining a brightness of the input image frame is below a threshold level, wherein the step of determining the corrected image frame based, at least in part, on the input image frame and the predicted disparity value is performed based on determining the brightness is below the threshold level.

The corrected image frame may be output from the processing and stored or displayed to the user, or example, the method may include determining a video sequence comprising a first image frame from the first image sensor, a second image frame from the second image sensor, and the corrected image frame, wherein the corrected image frame appears in the video sequence between the first image frame and the second image frame. In some aspects, further processing may be performed during the determining of the corrected image frame before output of the frame. For example, the step of determining the corrected image frame is further based on an image frame of the other of the first image sensor or the second image sensor.

The method may further include selectively including data in the generation of the disparity model. For example, the method may include storing a plurality of disparity values, wherein the model is based on the plurality of disparity values; and/or replacing a previous value of the plurality of disparity values with the first disparity value based on at least one of a number of values in the plurality of disparity values or a time associated with the previous value.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including receiving a first disparity value indicating a difference in field of view between a first image sensor and a second image sensor; receiving a first depth value corresponding to the first disparity value; determining a model for a disparity between the first image sensor and the second image sensor at a plurality of depth values, the model based, at least in part, on the first disparity value and the first depth; receiving an input image frame from one of the first image sensor or the second image sensor; receiving an input image depth corresponding to the input image frame; determining a predicted disparity value corresponding to the input image depth based, at least in part, on the model; and/or determining a corrected image frame based, at least in part, on the input image frame and the predicted disparity value. The corrected image frame may be determined based on the predicted disparity value as warped to match a field of view of the other of the first image sensor or the second image sensor. The predicted disparity value may include values for two or more axis, such that the first disparity value indicates a difference in field of view along a first axis, and the method further includes receiving a second disparity value indicating a difference in field of view between the first image sensor and the second image sensor along a second axis different from the first axis, wherein the step of determining the model is further based, at least in part, on the second disparity value. The depth value for training the model may be obtained from an auto-focus system, a range imaging system, or other system. For example, in the method operations, the first depth value comprises an auto-focus depth corresponding to a first input image frame captured by the first image sensor. As another example, the method may include determining the first depth value based on range imaging. In some aspects, the determining the first depth value comprises determining the first depth value based on a time of flight (ToF) measurement. In some aspects, the determining the first depth value comprises determining the first depth value based on a light detection and ranging (LIDAR) measurement.

The at least one processor may include one or more image signal processors and/or one or more processors including specific functionality for camera controls and/or processing. The at least one processor may also or alternatively include an application processor. The methods and techniques described herein may be entirely performed by the image signal processor or the application processor, or various operations may be split between the image signal processor and the application processor, and in some aspects split across additional processors.

The apparatus may include at least two image sensors, including a first image sensor and a second image sensor, wherein the first image sensor has a larger field of view (FOV) than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image capture is disclosed. The apparatus includes first and second means for capturing light data (e.g., image frames) representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors). The apparatus may further include one or more means for accumulating and/or focusing light rays into the one or more image sensors (including simple lenses, compound lenses, spherical lenses, and non-spherical lenses). The apparatus may also include one or more means for capturing depth (including time of flight (ToF) systems, light detection and ranging (LIDAR) systems, structured light systems, auto-focus systems) of the scenes captured by the means for capturing light data. The device may be configured to perform one or more operations comprising receiving a first disparity value indicating a difference in field of view between a first image sensor and a second image sensor; receiving a first depth value corresponding to the first disparity value; determining a model for a disparity between the first image sensor and the second image sensor at a plurality of depth values, the model based, at least in part, on the first disparity value and the first depth; receiving an input image frame from one of the first image sensor or the second image sensor; receiving an input image depth corresponding to the input image frame; determining a predicted disparity value corresponding to the input image depth based, at least in part, on the model; and/or determining a corrected image frame based, at least in part, on the input image frame and the predicted disparity value. The corrected image frame may be determined based on the predicted disparity value as warped to match a field of view of the other of the first image sensor or the second image sensor. The predicted disparity value may include values for two or more axis, such that the first disparity value indicates a difference in field of view along a first axis, and the method further includes receiving a second disparity value indicating a difference in field of view between the first image sensor and the second image sensor along a second axis different from the first axis, wherein the step of determining the model is further based, at least in part, on the second disparity value. The depth value for training the model may be obtained from an auto-focus system, a range imaging system, or other system. For example, in the method operations, the first depth value comprises an auto-focus depth corresponding to a first input image frame captured by the first image sensor. As another example, the method may include determining the first depth value based on range imaging. In some aspects, the determining the first depth value comprises determining the first depth value based on a time of flight (ToF) measurement. In some aspects, the determining the first depth value comprises determining the first depth value based on a light detection and ranging (LIDAR) measurement.

In an additional aspect of the disclosure, a non-transitory computer-readable medium stores instructions that, when executed by a processor, cause the processor to perform operations including those described in the method and techniques described herein. For example, the operations may include receiving a first disparity value indicating a difference in field of view between a first image sensor and a second image sensor; receiving a first depth value corresponding to the first disparity value; determining a model for a disparity between the first image sensor and the second image sensor at a plurality of depth values, the model based, at least in part, on the first disparity value and the first depth; receiving an input image frame from one of the first image sensor or the second image sensor; receiving an input image depth corresponding to the input image frame; determining a predicted disparity value corresponding to the input image depth based, at least in part, on the model; and/or determining a corrected image frame based, at least in part, on the input image frame and the predicted disparity value. The corrected image frame may be determined based on the predicted disparity value as warped to match a field of view of the other of the first image sensor or the second image sensor. The predicted disparity value may include values for two or more axis, such that the first disparity value indicates a difference in field of view along a first axis, and the method further includes receiving a second disparity value indicating a difference in field of view between the first image sensor and the second image sensor along a second axis different from the first axis, wherein the step of determining the model is further based, at least in part, on the second disparity value. The depth value for training the model may be obtained from an auto-focus system, a range imaging system, or other system. For example, in the method operations, the first depth value comprises an auto-focus depth corresponding to a first input image frame captured by the first image sensor. As another example, the method may include determining the first depth value based on range imaging. In some aspects, the determining the first depth value comprises determining the first depth value based on a time of flight (ToF) measurement. In some aspects, the determining the first depth value comprises determining the first depth value based on a light detection and ranging (LIDAR) measurement.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data over a first network connection of a plurality of network connections; and a processor coupled to the first network adaptor, and the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
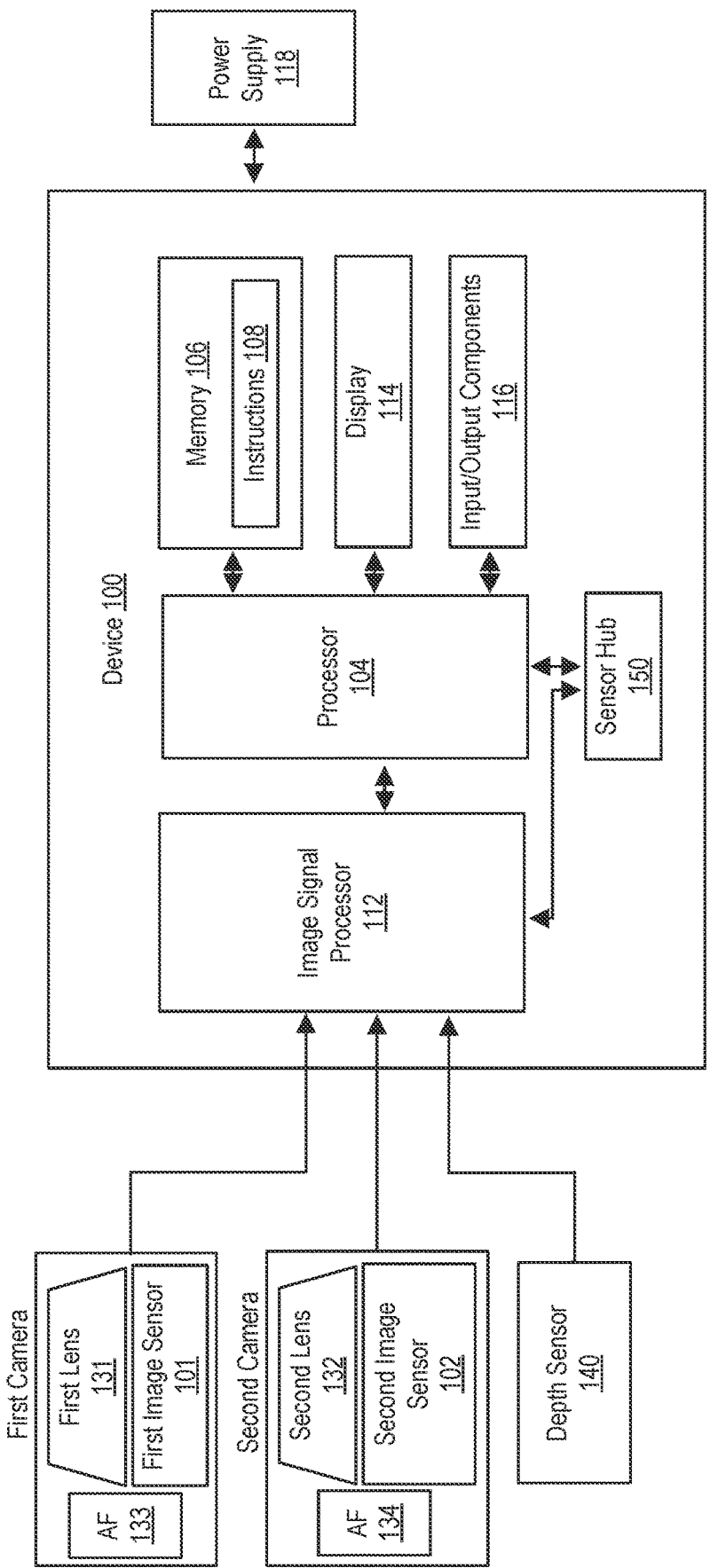
FIG. 1 is a block diagram of a computing device configured to perform one or more of the example techniques described in this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing of captured image frames for photography and video. Particular implementations of the subject matter described in this disclosure may be implemented to realize potential advantages or benefits, such as improved image quality by reducing artefacts in sequences of image frames captured during a change from one image sensor to another image sensor or another change that affects a field of view of a captured image frame in the sequence of image frames. The systems, apparatus, methods, and computer-readable media may be embedded in image capture devices, such as mobile phones, tablet computing devices, laptop computing devices, other computing devices, or digital cameras.

An example device for capturing image frames using multiple image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any other suitable components coupled to the image sensor. For example, an image sensor may also refer to other components of a camera, including a shutter, buffer, or other readout circuitry. The image sensor may further refer to an analog front end or other circuitry for converting analog signals to digital representations for the frame. Therefore, the term "image sensor" herein may refer to any suitable components for capture and readout of an image frame to an image signal processor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"), Further, aspects of the present disclosure may be implemented in devices having or coupled to image sensors of the same or different capabilities and characteristics (such as resolution, shutter speed, sensor type, and so on), Further, aspects of the present disclosure may be implemented in devices for processing image frames, whether or not the device includes or is coupled to the image sensors, such as processing devices that may retrieve stored images for processing, including processing devices present in a cloud computing system.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from multiple image sensors, such as a first image sensor 101, a second image sensor 102, and a depth sensor 140. The depth sensor 140 may include one or more range imaging devices, such as a time of flight (ToF) sensor, a light ranging and detection (LiDAR) system, an infrared (IR) ranging system, a structured light imaging system, and/or a radio frequency (RF) ranging system. In some aspects, multiple image signal processors may be used in place of a single image signal processor 112, such that each image sensor 101 and 102 is coupled to a different image signal processor. In some aspects, additional image sensors may share an image signal processor with one of two ISPs coupled to the sensors 101 and 102, or additional image signal processors may be coupled to each of the additional image sensors. In some aspects, each of multiple ISPs may perform operations in parallel on image frames obtained from respective image sensors, operations such as those described herein and with reference to FIGS. 2-6. In some aspects, one of the multiple ISPs may be a master device and the others slave devices, in which the master device performs coordination operations and/or operations that are performed on data obtained from two or more of the image sensors, such as operations for determining disparity between two image frames obtained from two image sensors. A computer vision processor (CVP) may be coupled to each of the image sensors to perform computer vision operations on the output of the image sensors, such as feature matching to determine a difference in field of view between the first image sensor and the second image sensor, and provide the difference and/or other feature matching information back to the ISP 112 or a processor 104, which uses the difference and/or other feature matching information as a disparity value. Feature matching may include operations such as determining a set of feature points in image frames obtained from the image sensors, defining a region around each feature point, and optionally normalizing the area around feature points to improve accuracy, computing a local descriptor for the normalized region, and matching descriptors between image frames captured by different image sensors. In some aspects, the feature matching algorithm may include one or more of scale-invariant feature transform (SIFT), random sample consensus (RANSAC), binary robust independent elementary features (BRIEF), speeded-up robust features (SURF), and/or oriented FAST and rotated brief (ORB) algorithms.

In some aspects, the device 100 also includes or is coupled to a processor 104 and a memory 106 storing instructions 108. The device 100 may also include or be coupled to a display 114 and a number of input/output (I/O) components 116, such as a touch screen interface and/or physical buttons. The device 100 may further include or be coupled to a power supply 118 for the device 100, such as a battery or a component to couple the device 100 to an energy source. The device 100 may also include or be coupled to additional features or components not shown. In one example, a wireless interface, which may include a number of transceivers and a baseband processor, may be included for a wireless communication device. In another example, one or more other sensors (such as a global positioning system (GPS) receiver) may be included in or coupled to the device. In a further example, an analog front end to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. Such non-camera sensors may be integrated in the device 100 and/or coupled to the device 100, One example non-camera sensor is a gyroscope, a device configured for measuring rotation, orientation, and/or angular velocity. Another example non-camera sensor is an accelerometer, a device configured to measuring acceleration, which may also be used to determine velocity and distance traveled by appropriately integrated the measured acceleration.

The image signal processor 112 may receive image data, such as used to form image frames, from a local bus connection to image sensors 101, 102 or by other connections, such as a wire interface to an external image sensor or wireless interface to a distant image sensor. In some embodiments, the device 100 may include a first camera comprising the first image sensor 101 and corresponding first lens 131 and a second camera comprising the second image sensor 102 and corresponding second lens 132. Each of the lenses 131 and 132 may have associated autofocus (AF) systems 133 and 134, respectively, that adjusts the lenses 131 and 132 to focus on a particular focal plane at a certain scene depth from the sensors 101 and 102. The AF systems 133 and 134 may be assisted by depth sensor 140 and/or provide depth information to other components of the device 100, such as the ISP 112, through metadata associated with the image frames captured by the sensors 101 and 102. In some aspects, the device 100 may include an interface to receive image data from the image sensors 101 and 102 located apart from the device 100. The device 100 may perform image processing on the image data from a combination of image sensors located within the device 100 or separate from the device 100.

The first image sensor 101 and the second image sensor 102 are configured to capture one or more image frames. For example, the first image sensor 101 and the second image sensor 102 may be included in one multiple camera configuration or in separate single cameras or a multiple camera configurations (such as a dual camera configuration, a triple camera configuration, and so on, for a smartphone or other suitable device). The image sensors 101 and 102 may also include or be coupled to one or more lenses 131 and 132 for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. For example, the first image sensor 101 may be coupled to a first lens 131 and the second image sensor 102 may be coupled to a second lens 132. The first lens 131 and second lens 132 may have different field of views, such as when the first lens 131 is an ultra-wide (UW) lens and the second lens 132 is a wide (W) lens. The device 100 may also include or be coupled to a flash, a depth sensor, a GPS, or other suitable components for imaging or supporting imaging applications.

The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees. Some aspects of the disclosure include processing the captured image frames, such as by adjusting spatial alignment of one or more of the captured image frames while the device transitions from capturing images of a scene using a first of the multiple image sensors to capturing images of the scene using a second of the multiple image sensors. Aspects of the present disclosure may be used for capturing image frames using multiple image sensors of an image capture device. For example, the camera motion data used for digital image stabilization (DIS) may be acquired using a combination of image frames from multiple image sensors.

The image signal processor 112 processes image frames captured by the image sensors 101 and 102. While FIG. 1 illustrates the device 100 as including two image sensors 101 and 102 coupled to the image signal processor 112, any number of image sensors may be coupled to the image signal processor 112. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may execute software and/or may include specific hardware (such as one or more integrated circuits (ICs)) to perform one or more operations described in the present disclosure.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to the memory and configured to access the memory for writing output frames for display or long-term storage.

In some embodiments, the processor 104 may include one or more general purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application may receive a capture command upon which a video comprising a sequence of image frames is captured and processed through one or more methods described herein for reducing artefacts by warping some image frames. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, at least one of the image signal processor 112 or the processor 104 can execute instructions to perform various operations described herein. For example, execution of the instructions can instruct the image signal processor 112 to begin or end capturing an image frame or a sequence of image frames. As another example, execution of the instructions can instruct the image signal processor 112 to change from capturing a first image of a scene captured using the first image sensor 101 to a second image of the scene captured using the second image sensor 102. As a further example, execution of the instructions can instruct the image signal processor 112 to change zoom levels from a first zoom level to a second zoom level, which may result in a switch from a first image sensor with a first field of view to a second image sensor with a second field of view. As yet another example, execution of the instructions can instruct the image signal processor 112 to switch from a first image sensor for capturing image frames to a second image sensor for capturing image frames during the recording of a sequence of image frames.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, the processor 104, the memory 106, the image signal processor 112, the display 114, and the I/O components 116 may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

A multi-sensor device such as the apparatus 100 may switch from one image sensor to another image sensor, such as between sensor 101 and 102, based on a user request or certain criteria being met. For example, a user may indicate a request to switch from a wide angle (W) lens corresponding to sensor 101 to a tele lens (T) corresponding to a sensor 102 by initiating a portrait mode in a camera application that is accessing the sensors 101 and 102. As another example, a user may change a zoom level in the camera application that causes the image signal processor 112 to switch from sensor 101 to sensor 102 based on characteristics of the lenses corresponding to the sensors 101 and 102. As a further example, changing scene characteristics, such as light levels, may cause the image signal processor 112 to switch from sensor 101 to sensor 102 to achieve better light sensitivity.

In any of these example (or other) switches between image sensors, an artefact may appear in a sequence of image frames at or around the change between sensors due to a difference in field of view of the sensors, Shortcomings mentioned here are only representative and are included to highlight problems that the inventors have identified with respect to existing devices and sought to improve upon. Aspects of devices described below may address some or all of the shortcomings as well as others known in the art, Aspects of the improved devices described herein may present other benefits than, and be used in other applications than, those described above.

In one aspect of a device 100, image frames captured from the sensors 101 and 102 may be corrected to improve a match in field of view between the sensors 101 and 102. For example, the input image frame from one sensor may be geometrically warped based on a disparity, or difference, between the image frames captured by the sensors 101 and 102. The disparity between the image frames may result from different positions for the image sensors 101 and 102 and imperfect alignment between the sensors 101 and 102. A disparity between the image frames may be determined and used as a basis for determining the amount and manner of geometric warping to be applied during generation of a corrected image frame. An actual disparity between image frames may be determined through feature matching between a first image frame captured from a first image sensor and a second image frame captured from a second image sensor. The feature matching may be performed using computer vision (CV).

The feature matching process may fail due to sensor failures, scene conditions, scene changes, and/or other conditions. When the feature matching fails, the disparity values for determining the geometric warping are not available or inaccurate, which may result in poor performance of the geometric warping. The result is a sequence of image frames with noticeable artefacts, or at worst, missing image frames from the sequence. A model may be built from known disparity values, such as those determined during previous image captures on the device, during a calibration routine of the device, and/or pre-loaded on the device. That model may be used to supply predicted disparity values to supplement or replace disparity values determined from feature matching or other disparity determination techniques. A model generation is described in one aspect in FIG. 2.

Figure 2:
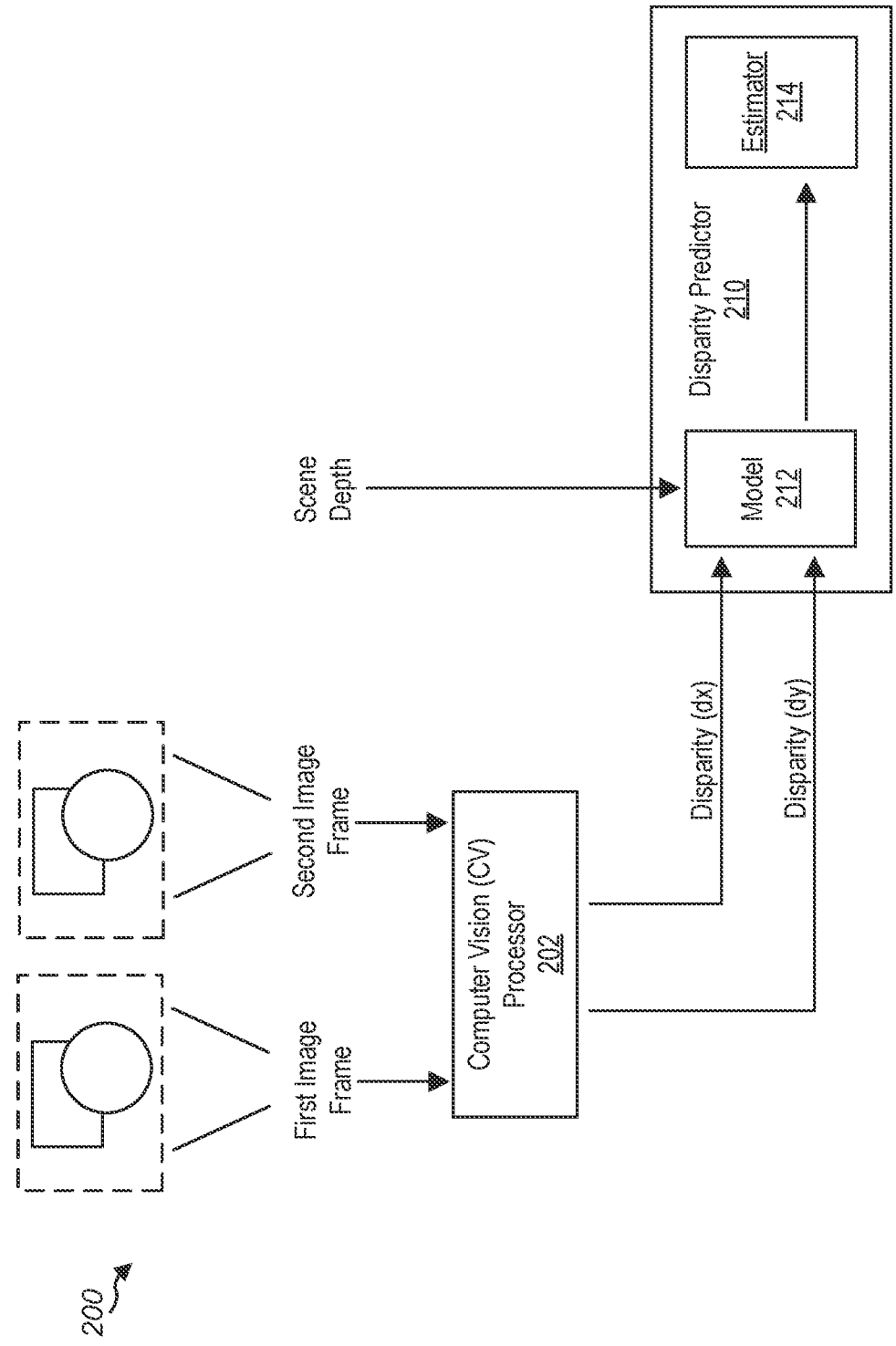
FIG. 2 is a block diagram illustrating modeling of image sensor disparity in a multi-sensor device according to one or more aspects of the disclosure.

FIG. 2 is a block diagram illustrating modeling of image sensor disparity in a multi-sensor device according to one or more aspects of the disclosure. A system 200 illustrates the generation of a model 212 in a disparity predictor 210. A computer vision (CV) processor (CVP) 202 receives a first image frame and a second image frame capturing a scene from different fields of view. The image frames may be received at the CV processor 202 from image sensors, such as through image signal processors 112, or retrieved from memory. The CV processor 202 may analyze the images to identify image features and correlate matching image features from the first image frame to the second image frame. Based on the matched features, the CV processor 202 may determine a shift in the feature from the first image frame to the second image frame. That shift may be represented as one or more disparity values, such as a first disparity value along a first axis and a second disparity value along a second axis. In some aspects, the first axis and second axis may be orthogonal, such as when the first and second axes are an x-axis and a y-axis. The determined disparity value(s), such as dx and dy values, may be provided by the CV processor 202 to a disparity predictor 210. The predictor 210 may also receive a scene depth corresponding to the scene reflected in the first image frame and the second image frame from which the dx and dy values were determined. The scene depth may reflect a distance from an image sensor to an object of interest as measured by a depth sensor. The scene depth may alternatively or additionally be received as the auto-focus distance corresponding to the first or second image frame from auto-focus sensors. The predictor 210 may apply the scene depth and the disparity values to train a model 212. The operations of the disparity predictor 210 may be execute by an image signal processor (ISP), such as ISP 112. The operations of the disparity predictor 210 may alternatively be executed by a processor, such as a digital signal processor (DSP) or the processor 104.

The model 212 may be a non-linear regression model, linear regression model, or machine learning algorithm. Machine learning models, as described herein, may include logistic regression techniques, linear discriminant analysis, linear regression analysis, artificial neural networks, machine learning classifier algorithms, or classification/regression trees in some embodiments. In some aspects, the machine learning may include one or more artificial neural networks, which may include an interconnected group of artificial neurons (e.g., neuron models) for modeling relationships between parameters, such as disparity and scene depth. In some aspects, the machine learning may include one or more convolutional neural networks, which are a type of feed-forward artificial neural network. Convolutional neural networks may include collections of neurons that each have a receptive field and that collectively tile an input space. In some aspects, the machine learning may include one or more deep learning architectures, such as deep belief networks and deep convolutional networks, which are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features. In various aspects, machine learning systems may employ Naive Bayes predictive modeling analysis of several varieties, learning vector quantization, or implementation of boosting algorithms such as Adaboost or stochastic gradient boosting systems for iteratively updating weighting to train a machine learning classifier to determine a relationship between an influencing attribute, such as scene depth, and a disparity and/or a degree to which such an influencing attribute affects the outcome of such a system or disparity value.

After training, the disparity predictor 210 may use the model 212 to predict disparity values for pairs of image frames captured from the image device 100. In some aspects, the display predictor 210 may be executed by logic circuitry of the device 100 to obtain training of the model 212 based on image frames captured by the image sensors 101 and 102. In some aspects, the display predictor 210 may be executed by a remote cloud-based computing system. When the model 212 is generated in the cloud, the model 212 may be exported and used on one or more image capture devices such as device 100. In some aspects, the model 212 may be trained in the cloud from data captured from other image capture devices to generate a general model that is loaded on individual devices 100 and then revised by a predictor on the individual devices based on each device's unique characteristics. For example, dropping a device may result in a change of the disparity between the image sensors that is unique to one particular device, and that may be accounted for in the local revisions of the model 212.

Figure 3:
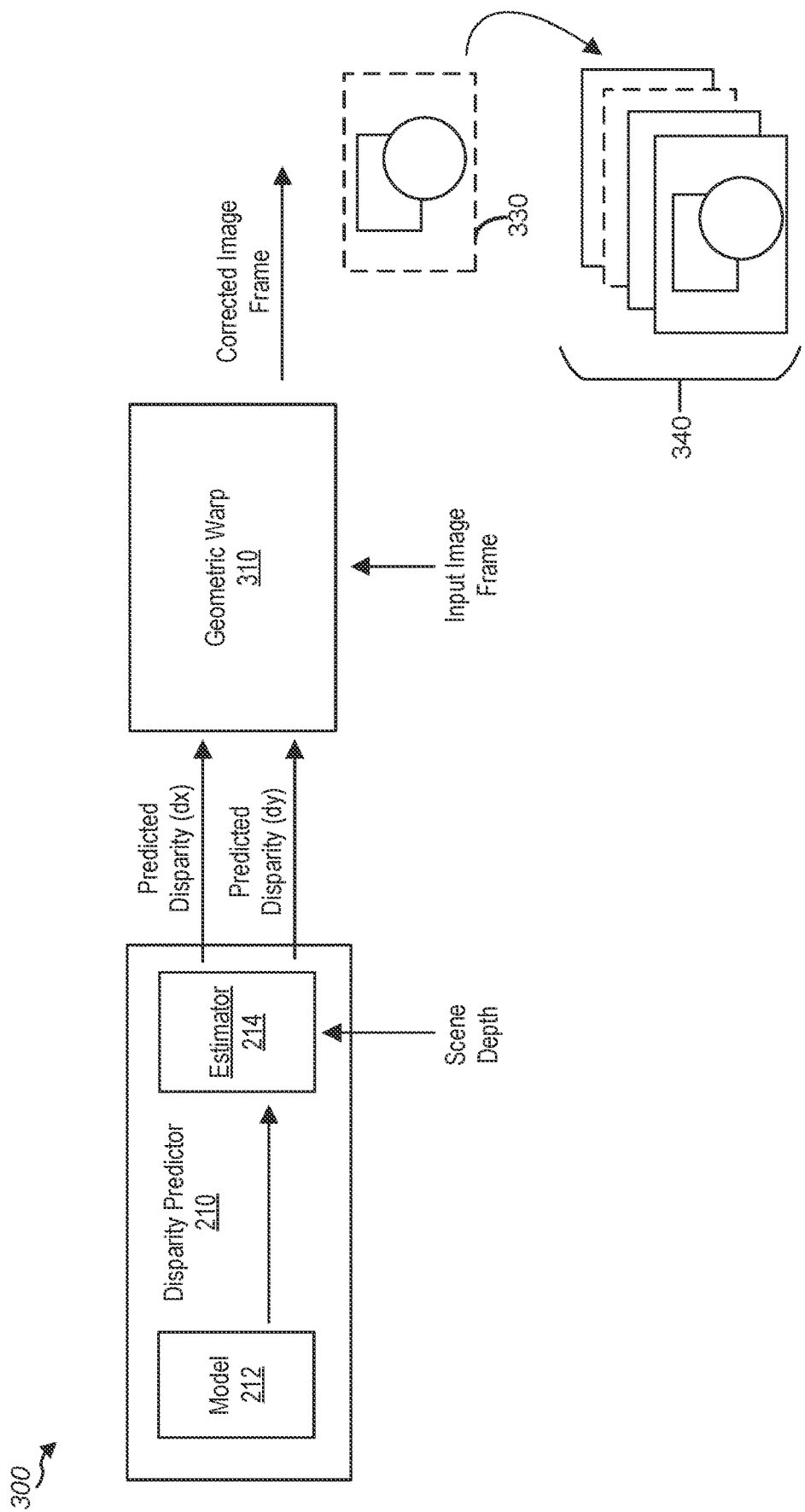
FIG. 3 is a block diagram illustrating warping of image frames using predicted disparity according to one or more aspects of the disclosure.

Although a CV processor 202 is shown as generating disparity values for training of the model 212, other techniques may be used for generating training data, Regardless of the manner of training the model 212, the disparity predictor 210 may use an estimator 214 to generate predicted disparity values using the model 212. An example generation and use of predicted disparity values is shown in FIG. 3. FIG. 3 is a block diagram illustrating warping of image frames using predicted disparity according to one or more aspects of the disclosure. A system 300 uses the disparity predictor 210 to generate one or more predicted disparity values. The estimator 214 of the predictor 210 may receive a scene depth value for which a predicted disparity value is desired. For example, an auto-focus depth corresponding to an image frame being processed may be input to the estimator 214. The estimator 214 may access the model 212 to obtain predicted disparity values dx and dy for the input scene depth.

The predicted disparity values may be input to a geometric warp module 310 for correcting an input image frame. The warp module 310 receives an input image frame and the predicted disparity values. The warp module 310 then determines a corrected image frame 330 based, at least in part, on the predicted disparity values and the input image frame. The corrected image frame 330 may be further processed before, after, or in parallel with the processing of the warp module 310. Other processing of the corrected image frame may include computational photography, high dynamic range (HDR), multi-frame noise reduction (MFNR), low light enhancement, super resolution processes. Such computational photography may include processing in which the determining of the corrected image frame includes fusing the input image frame (after application of warping through a transformation matrix to match another image sensor) with an image frame from another image sensor and/or additional image frames from the same image sensor to improve appearance of the corrected image frame. Examples of such computational photography include obtaining improved dynamic range from the fusing of one or more additional image frames from one or more other image sensors, obtaining reduced noise from the fusing of one or more additional image frames from one or more image sensors, and/or obtaining higher resolution from the fusing of one or more additional image frames from one or more other image sensors. The corrected image frame 330 may be geometrically warped to improve matching of a field of view of the input image frame to other image frames in a sequence 340 of image frames captured at or around a switch from a first image sensor to a second image sensor with a different field of view than the first image sensor. The corrected image frame 330 may appear in a video sequence of image frames between first image frames captured from the first image sensor and second image frames captured form the second image sensor.

Figure 4:
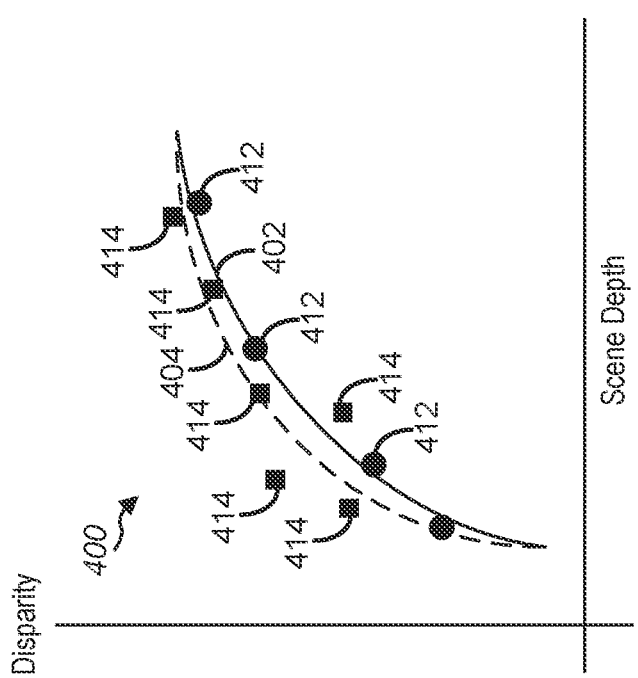
FIG. 4 is a graph illustrating a generated model for image sensor disparity according to one or more aspects of this disclosure.

One example model 212 for the generation of predicted disparity values by the estimator 214 is shown in FIG. 4. FIG. 4 is a graph illustrating a generated model for image sensor disparity according to one or more aspects of this disclosure. A graph 400 includes a first line 402 reflecting a first predicted disparity value and a second line 404 reflecting a second predicted disparity value. The first and second lines 402 and 404 may reflect disparity values along different axes, such as dx and dy disparity values described above. The first line 402 may be generated from data 412 collected during training of the model 212, and the second line 404 may be generated from data 414 collected during training of the model 212.

The discrete data points for data 412 and 414 may be stored in memory in the predictor 210, memory 106, in the cloud, or in other storage locations. In some aspects, the data 412 and 414 may be used to update the training of the model 212, such as when new data is received. In some aspects, the model is generated from stored data 412 and 414 on-demand as predicted disparity values are requested. In some aspects, the amount of data stored is a predetermined number of sets of disparity values with corresponding scene depth. When new data is received, old sets may be discarded based on an algorithm such as first in first out (FIFO) or an assigned priority associated with the sets of values. In some aspects, the amount of data stored is limited to a certain time period, such that sets of data exceeding a certain age are removed from the stored data. In some aspects, a combination of time, number, and other criteria may be used to determine a longevity of data 412 and 414 stored for generating the model 212. For example, data from an accelerometer may be used to determine a drop incident has occurred that may cause the model 212 to no longer be accurate, such that data received prior to the drop incident should be deleted or de-weighted in the generation of the model 212. As another example, a certain number of disparity samples for different depth ranges may be stored, such as ten disparity values for depths of 0-10 centimeters, another ten disparity values for depths of 10-20 centimeters, another ten disparity values for depths of 20-50 centimeters, and twenty values for depths of 50 centimeters to infinity. Each time new data is added, old data is aged out, and/or old data is replaced with new data, the model 212 may be updated through a least squares method. The model 212 reflecting lines 402 and 404 may be represented by values, such as coefficients corresponding to an equation and/or a matrix and/or parameters of a machine learning algorithm, and those values stored in the predictor 210.

Figure 5:
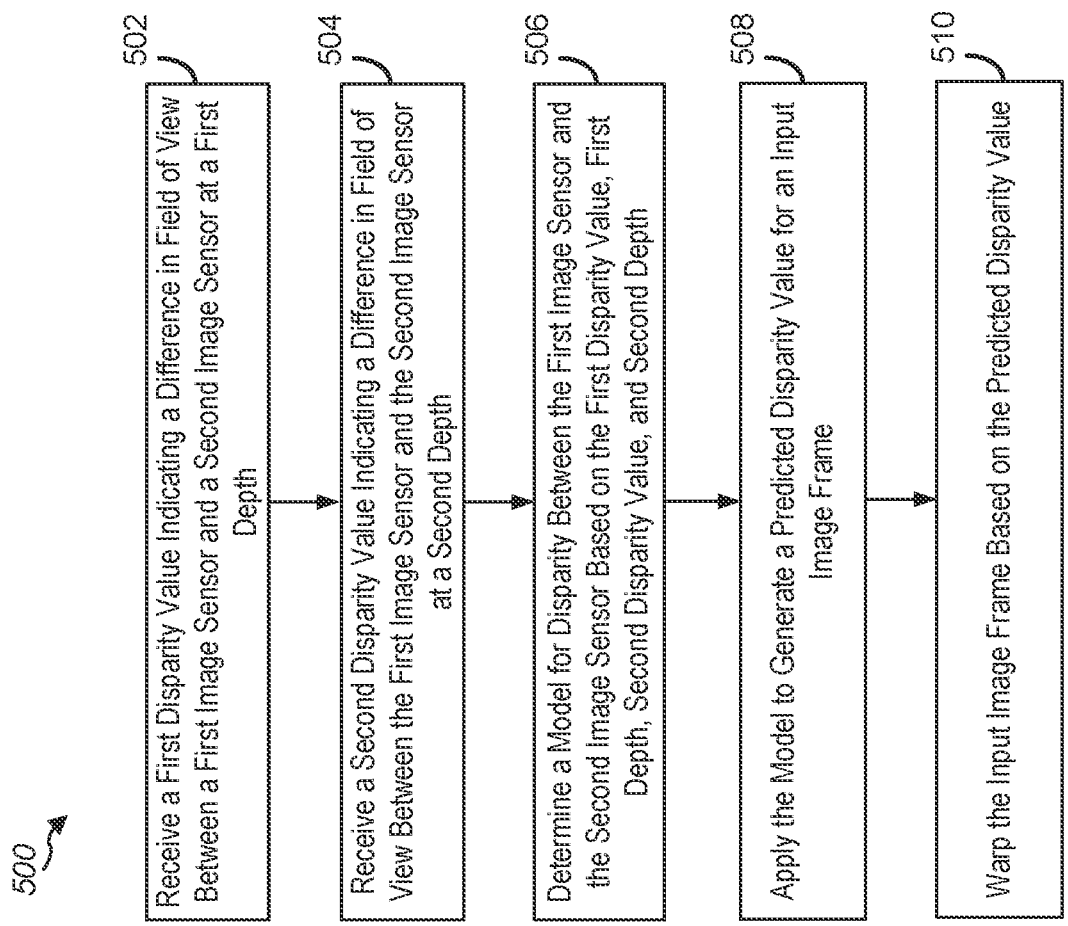
FIG. 5 is a flow chart illustrating a method for correcting image frames using predicted disparity data according to one or more aspects of the disclosure.

One aspect of a method of generating and applying aspects of the model 212 described herein for correcting an image frame is described with reference to FIG. 5. FIG. 5 is a flow chart illustrating a method for correcting image frames using predicted disparity data according to one or more aspects of the disclosure. A method 500 begins at block 502 with receiving a first disparity value indicating a difference in field of view between a first image sensor and a second image sensor at a corresponding first depth. At block 504, a second disparity value is received indicating a difference in field of view between a first image sensor and a second image sensor at a corresponding second depth. A model may be built from as few as two scene depths with corresponding disparity values.

At block 506, a model is determined for disparity between the first image sensor and the second image sensor based on the first disparity value, first depth, second disparity value, and second depth. The first disparity value and first depth may form a first training set, and the second disparity and second depth may form a second training set. The training sets may include disparity values with the same depth values. The model may have a machine learning algorithm that learns the relationship between disparity and scene depth from the training sets. The model may alternatively be a programmed equation, having coefficients, constants, and/or other parameters that are adjusted as training sets are received to reflect the relationship between disparity and scene depth. Thus, a model may be built with as few as two training sets, such as when the model is a linear equation.

The model may be reconfigured to higher-order equations when additional training sets are available.

At block 508, the model is applied to generate a predicted disparity value for an input image frame. For example, a depth corresponding to the input image frame may be input to the model to generate one or more predicted disparity values that predict disparity values for the difference in field of view between the first image sensor and the second image sensor. In some aspects, the input image frame may be an image frame captured by one of the first image sensor or the second image sensor. In some aspects, the input image frame may be an image frame captured by an image sensor corresponding to one of the first or the second image sensor, such as a similar sensor on a different device from the device on which the training data for the model was obtained. The predicted disparity value may be generated for image frames captured from one of the first and/or second image sensors and compared with an actual disparity measured from the image sensors to provide feedback for adjusting the model. Predicted disparity values may be used for modifying the image frame captured from one or both of the first and second image sensors. In one example use of the predicted disparity values, the predictions may be used for geometrically warping one or both of the first and second image sensors.

At block 510, the input image frame is warped based on the predicted disparity value of block 508. The warping may involve transforming a grid of the input image frame to match a field of view of the other image sensor during an image sensor switch. In one aspect, the predicted disparity values may be used to produce an artificial computer vision processing matrix to replace an output of a CV processor. In one aspect, the predicted disparity values may be applied on a crop window to achieve a non-center cropping to reduce the shift needed to be done in computer vision processing stage. When the warped image frame is viewed in a sequence of image frames as a video, the warped image frame may reduce the appearance of a jump, skip, or other artefact around the switching of image sensors. The image warping may continue for two or more image frames of the video sequence to smooth the transition from one image sensor to another image sensor, such as by scaling the geometric warping by a scaling factor that decreases towards a unity value with each subsequent frame. When the scaling factor reaches unity value, such that the warped image frame based on a current image sensor matches a field of view of another image sensor, the image sensor may switch to that other image sensor. After switching, processing of image frames from the other image sensor may continue and the preview video or recorded video continue. Although warping is described as a method for determining a corrected image frame from the input image frame, other processing of the input image frame may be performed in addition to or in the alternative to warping. Some of the processing may be based on the predicted disparity value, and some of the processing may be based on other values.

In some aspects, the predicted disparity values may be used for correcting all image frames output from the image signal processor. In some aspects, the predicted disparity values may be used selectively during the operation of an image capture device to determine corrected output frames. For example, the use of predicted disparity values may be turned on for a certain time period and off for another time period. The "off" time period may be used to train the model, and the predicted disparity values then turned back on. For example, the user may enter a calibration mode in which the devices requests the user enter a well-lit room and take a series of photographs of an object at several depths by walking toward the object to obtain training sets. As another example, criteria may be evaluated for input image frames and the evaluation of those criteria used to determine whether to use predicted disparity values generated from the model for any particular input image frame. One aspect for selectively applying predicted disparity values in the determination of a corrected image frame is described with reference to FIG. 6.

Figure 6:
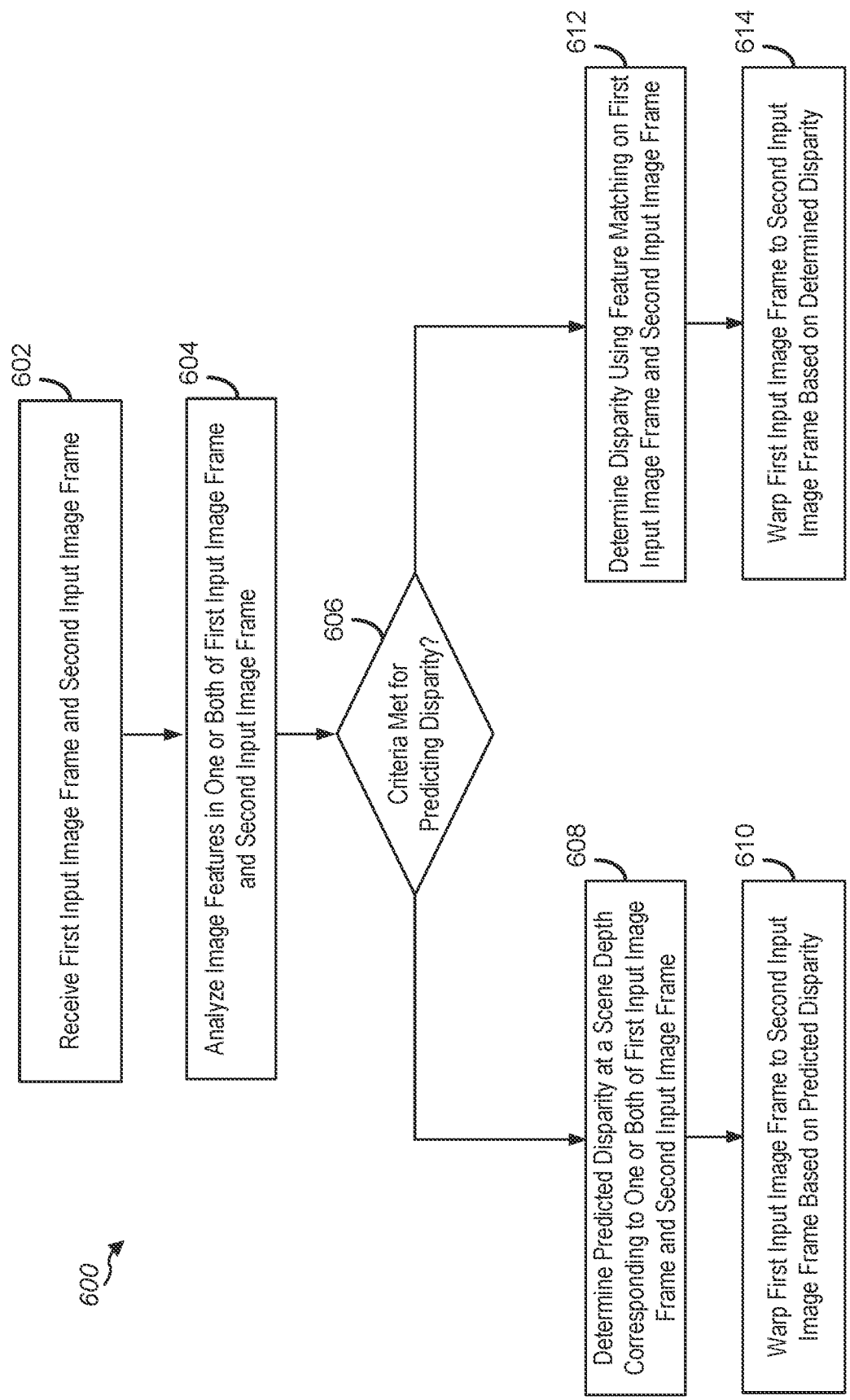
FIG. 6 is a flow chart illustrating a method of selectively using predicted disparity data in the correcting of image frames according to one or more aspects.

FIG. 6 is a flow chart illustrating a method of selectively using predicted disparity data in the correcting of image frames according to one or more aspects. A method 600 includes, at block 602, receiving a first input image frame and a second input image frame. At block 604, image features are analyzed in one or both of the first and second input image frames. The analysis of block 604 may include feature matching between the first and second input image frames. The difference between the location of matched features from the first and second image frame may be used as an actual disparity in the warping of an image frame. However, the image matching may fail, resulting in a subsequent failure of the image warping, which creates artefacts when the image frame is viewed in a sequence of image frames as a video. The analysis at block 604 may be examined to determine whether to use the actual disparity and/or use a predicted disparity in the processing of an input image frame.

At block 606, criteria are evaluated to determine if predicted disparity should be used for determining corrected image frames. The criteria may include whether feature matching was successful or unsuccessful. The criteria may also or alternatively include whether a confidence level of the feature matching is above a threshold level. Other criteria based on characteristics of the image frames may also be used. For example, an average brightness of the first and/or second input image frames may be determined and compared with a threshold to determine if the image is too dark for high confidence in image matching. As another example, a focus position and/or confidence of a lens capturing the first and/or second image frames may be determined and compared with a threshold to determine if the image is too out of focus for high confidence in image matching. In some aspects, the feature matching of block 604 may generate a transformation matrix for the input image frame for warping the input image frame to a field of view of the other of the first image sensor or the second image sensor. A confidence level for the transformation matrix may be compared to a threshold level to evaluate whether to use predicted disparity.

If the criteria are met at block 606, the method 600 continues to block 608 to determine predicted disparity at a scene depth corresponding to one or both of the first and second input image frames. Then, at block 610, the first input image frame may be warped to the second input image frame, or vice versa, based on the predicted disparity of block 608.

If the criteria are not met at block 606 for using predicted disparity, the method 600 continues to block 612 to determine disparity using feature matching on the first and second input image frames. Then, at block 614, the first input image frame may be warped to the second input image frame, or vice versa, based on the determined disparity of block 612.

In one or more aspects, techniques for supporting image capture with reduced artefacts, such as jumps and skips of objects in a scene as recorded in a video sequence, resulting in higher quality photographs and videos produced by a device. The improved video quality may be provided by obtaining more accurate disparity values during the warping of an image frame captured by one image sensor to match a field of view of another image sensor to facilitate switching from one image sensor to another image sensor. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques for supporting image capture with reduced artefacts, such as jumps and skips of objects in a scene as recorded in a video sequence, resulting in higher quality photographs and videos produced by a device. The improved video quality may be provided by obtaining more accurate disparity values during the warping of an image frame captured by one image sensor to match a field of view of another image sensor to facilitate switching from one image sensor to another image sensor. In one or more aspects, supporting the image capture may include an apparatus configured to receive a first disparity value indicating a difference in field of view between a first image sensor and a second image sensor. The apparatus is further configured to receive a first depth value corresponding to the first disparity value. The apparatus is further configured to determine a model for a disparity between the first image sensor and the second image sensor at a plurality of depth values, the model based, at least in part, on the first disparity value and the first depth. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus and include transmitting the corrected image frame to another mobile device, to a base station, or to a server either through the base station or directly to the server or other mobile device.

In a first aspect, the apparatus is configured to receive an input image frame from one of the first image sensor or the second image sensor.

In a second aspect, in combination with the first aspect, the apparatus is configured to receive an input image depth corresponding to the input image frame.

In a third aspect, in combination with the second aspect, the apparatus is configured to determine a predicted disparity value corresponding to the input image depth based, at least in part, on the model.

In a fourth aspect, in combination with the third aspect, the apparatus is configured to determine a corrected image frame based, at least in part, on the input image frame and the predicted disparity value.

In a fifth aspect, in combination with one or more of the first aspect through the fourth aspect, determining the corrected image frame includes determining, based on the predicted disparity value, the corrected image frame as warped to match a field of view of the other of the first image sensor or the second image sensor.

In a sixth aspect, in combination with one or more of the first aspect through the fifth aspect, determining the corrected image frame includes determining a transformation matrix for warping the input image frame to a field of view of the other of the first image sensor or the second image sensor.

In a seventh aspect, in combination with the sixth aspect, determining the transformation matrix includes determining the transformation matrix with computer vision processing (CVP).

In an eighth aspect, in combination with the sixth aspect, the apparatus is configured to determine whether a confidence level associated with the transformation matrix is below a threshold level. The step of determining the corrected image frame based, at least in part, on the input image frame and the predicted disparity value is performed based on determining the confidence level of the transformation matrix is below the threshold level.

In a ninth aspect, in combination with one or more of the first aspect through the eighth aspect, the apparatus is configured to determine an image characteristic of the input image frame is below a threshold level. The step of determining the corrected image frame based, at least in part, on the input image frame and the predicted disparity value is performed based on determining the image characteristic is below the threshold level.

In a tenth aspect, in combination with one or more of the first aspect through the ninth aspect, the apparatus is configured to determine a brightness of the input image frame is below a threshold level. The step of determining the corrected image frame based, at least in part, on the input image frame and the predicted disparity value is performed based on determining the brightness is below the threshold level.

In an eleventh aspect, in combination with one or more of the first aspect through the tenth aspect, the apparatus is configured to determine a video sequence including a first image frame from the first image sensor, a second image frame from the second image sensor, and the corrected image frame. The corrected image frame appears in the video sequence between the first image frame and the second image frame.

In a twelfth aspect, in combination with one or more of the first aspect through the eleventh aspect, the step of determining the corrected image frame is further based on an image frame of the other of the first image sensor or the second image sensor.

In a thirteenth aspect, alone or in combination with one or more of the first aspect through the twelfth aspect, the first disparity value indicates a difference in field of view along a first axis.

In a fourteenth aspect, in combination with the thirteenth aspect, the method is configured to receive a second disparity value indicating a difference in field of view between the first image sensor and the second image sensor along a second axis different from the first axis. The step of determining the model is further based, at least in part, on the second disparity value.

In a fifteenth aspect, alone or in combination with one or more of the first aspect through the fourteenth aspect, determining the model includes storing a plurality of disparity values. The model is based on the plurality of disparity values.

In a sixteenth aspect, in combination with o the fifteenth aspect, replace a previous value of the plurality of disparity values with the first disparity value based on at least one of a number of values in the plurality of disparity values or a time associated with the previous value.

In a seventeenth aspect, alone or in combination with one or more of the first aspect through the sixteenth aspect, the first depth value includes an auto-focus depth corresponding to a first input image frame captured by the first image sensor.

In an eighteenth aspect, alone or in combination with one or more of the first aspect through the seventeenth aspect, the apparatus is configured to determine the first depth value based on range imaging.

In a nineteenth aspect, in combination with the eighteenth aspect, determining the first depth value includes determining the first depth value based on a time of flight (ToF) measurement.

In a twentieth aspect, in combination with one or more of the eighteenth aspect through the nineteenth aspect, determining the first depth value includes determining the first depth value based on a light detection and ranging (LIDAR) measurement.

In one or more aspects, techniques for supporting image capture may include additional aspects, such as any single aspect or any combination of aspects described below or in connection with one or more other processes or devices described elsewhere herein. In one or more aspects, supporting image capture may include an apparatus configured to a processor. The apparatus is further configured to a memory coupled to the processor and storing instruction that, when executed by the processor, cause the device to perform operations including receiving a first disparity value indicating a difference in field of view between a first image sensor and a second image sensor. The apparatus is further configured to receive a first depth value corresponding to the first disparity value. The apparatus is further configured to determine a model for a disparity between the first image sensor and the second image sensor at a plurality of depth values, the model based, at least in part, on the first disparity value and the first depth. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-first aspect, the instructions cause the device to perform operations including receiving an input image frame from one of the first image sensor or the second image sensor.

In a twenty-second aspect, in combination the twenty-first aspect, the apparatus is configured to receive an input image depth corresponding to the input image frame.

In a twenty-third aspect, in combination with the twenty-second aspect, the apparatus is configured to determine a predicted disparity value corresponding to the input image depth based, at least in part, on the model.

In a twenty-fourth aspect, n combination with the twenty-third aspect, the apparatus is configured to determine a corrected image frame based, at least in part, on the input image frame and the predicted disparity value.

In a twenty-fifth aspect, in combination with one or more of the twenty-first aspect through the twenty-fourth aspect, determining the corrected image frame includes determining, based on the predicted disparity value, a corrected image frame warped to match a field of view of the other of the first image sensor or the second image sensor.

In a twenty-sixth aspect, in combination with one or more of the twenty-first aspect through the twenty-fifth aspect, determining the corrected image frame includes determining, based on the predicted disparity value, the corrected image frame warped to match a field of view of the other of the first image sensor or the second image sensor.

In a twenty-seventh aspect, in combination with one or more of the twenty-first aspect through the twenty-sixth aspect, determining the corrected image frame includes determining a transformation matrix for warping the input image frame to a field of view of the other of the first image sensor or the second image sensor.

In a twenty-eighth aspect, in combination with the twenty-seventh aspect, determining the transformation matrix includes determining the transformation matrix with computer vision processing (CVP).

In a twenty-ninth aspect, in combination with one or more of the twenty-seventh aspect through the twenty-eighth aspect, the instructions cause the device to perform operations further including determining whether a confidence level associated with the transformation matrix is below a threshold level. The step of determining the corrected image frame based, at least in part, on the input image frame and the predicted disparity value is performed based on determining the confidence level of the transformation matrix is below the threshold level.

In a thirtieth aspect, in combination with one or more of the twenty-first aspect through the twenty-ninth aspect, the instructions cause the device to perform operations further including determining an image characteristic of the input image frame is below a threshold level. The step of determining the corrected image frame based, at least in part, on the input image frame and the predicted disparity value is performed based on determining the image characteristic is below the threshold level.

In a thirty-first aspect, in combination with one or more of the twenty-first aspect through the thirtieth aspect, the instructions cause the device to perform operations further including determining a brightness of the input image frame is below a threshold level. The step of determining the corrected image frame based, at least in part, on the input image frame and the predicted disparity value is performed based on determining the brightness is below the threshold level.

In a thirty-second aspect, in combination with one or more of the twenty-first aspect through the thirty-first aspect, the instructions cause the device to perform operations further including determining a video sequence including a first image frame from the first image sensor, a second image frame from the second image sensor, and the corrected image frame. The corrected image frame appears in the video sequence between the first image frame and the second image frame.

In a thirty-third aspect, in combination with one or more of the twenty-first aspect through the thirty-second aspect, the step of determining the corrected image frame is further based on an image frame of the other of the first image sensor or the second image sensor.

In a thirty-fourth aspect, alone or in combination with one or more of the twenty-first aspect through the thirty-fourth aspect, the first disparity value indicates a difference in field of view along a first axis.

In a thirty-fifth aspect, in combination with the thirty-third aspect, the instructions cause the device to perform operations further including receiving a second disparity value indicating a difference in field of view between the first image sensor and the second image sensor along a second axis different from the first axis. The step of determining the model is further based, at least in part, on the second disparity value.

In a thirty-sixth aspect, alone or in combination with one or more of the twenty-first aspect through the thirty-fifth aspect, determining the model includes storing a plurality of disparity values. The model is based on the plurality of disparity values.

In a thirty-seventh aspect, in combination with o the thirty-sixth aspect, replacing a previous value of the plurality of disparity values with the first disparity value based on at least one of a number of values in the plurality of disparity values or a time associated with the previous value.

In a thirty-eighth aspect, alone or in combination with one or more of the twenty-first aspect through the thirty-seventh aspect, the first depth value includes an auto-focus depth corresponding to a first input image frame captured by the first image sensor.

In a thirty-ninth aspect, alone or in combination with one or more of the twenty-first aspect through the thirty-eighth aspect, the instructions cause the device to perform operations further including determining the first depth value based on range imaging.

In a fortieth aspect, in combination with the thirty-ninth aspect, determining the first depth value includes determining the first depth value based on a time of flight (ToF) measurement.

In a forty-first aspect, in combination with the fortieth aspect, determining the first depth value includes determining the first depth value based on a light detection and ranging (LIDR) measurement.

In one or more aspects, techniques for supporting image capture may include additional aspects, such as any single aspect or any combination of aspects described below or in connection with one or more other processes or devices described elsewhere herein. In one or more aspects, supporting image capture may include an apparatus configured to cause the device to perform operations including receiving a first disparity value indicating a difference in field of view between a first image sensor and a second image sensor. The apparatus is further configured to perform operations including receiving a first depth value corresponding to the first disparity value; and. The apparatus is further configured to perform operations including determining a model for a disparity between the first image sensor and the second image sensor at a plurality of depth values, the model based, at least in part, on the first disparity value and the first depth. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-second aspect, the instructions, when executed by a processor of a device, cause the device to perform operations further including receiving an input image frame from one of the first image sensor or the second image sensor.

In a forty-third aspect, in combination with o the forty-second aspect, receiving an input image depth corresponding to the input image frame.

In a forty-fourth aspect, in combination with o the forty-third aspect, determining a predicted disparity value corresponding to the input image depth based, at least in part, on the model.

In a forty-fifth aspect, in combination with the forty-fourth aspect, determining a corrected image frame based, at least in part, on the input image frame and the predicted disparity value.

In a forty-sixth aspect, in combination with one or more of the forty-second aspect through the forty-fifth aspect, determining the corrected image frame includes determining, based on the predicted disparity value, a corrected image frame warped to match a field of view of the other of the first image sensor or the second image sensor.

In a forty-seventh aspect, in combination with one or more of the forty-second aspect through the forty-sixth aspect, determining the corrected image frame includes determining a transformation matrix for warping the input image frame to a field of view of the other of the first image sensor or the second image sensor.

In a forty-eighth aspect, in combination with the forty-seventh aspect, 3 determining the transformation matrix includes determining the transformation matrix with computer vision processing (CVP).

In a forty-ninth aspect, in combination with one or more of the forty-seventh aspect through the forty-eighth aspect, the instructions, when executed by a processor of a device, cause the device to perform operations further including determining whether a confidence level associated with the transformation matrix is below a threshold level. The step of determining the corrected image frame based, at least in part, on the input image frame and the predicted disparity value is performed based on determining the confidence level of the transformation matrix is below the threshold level.

In a fiftieth aspect, in combination with one or more of the forty-second aspect through the forty-ninth aspect, the instructions, when executed by a processor of a device, cause the device to perform operations further including determining an image characteristic of the input image frame is below a threshold level. The step of determining the corrected image frame based, at least in part, on the input image frame and the predicted disparity value is performed based on determining the image characteristic is below the threshold level.

In a fifty-first aspect, in combination with one or more of the forty-second aspect through the fiftieth aspect, the instructions, when executed by a processor of a device, cause the device to perform operations further including determining a brightness of the input image frame is below a threshold level. The step of determining the corrected image frame based, at least in part, on the input image frame and the predicted disparity value is performed based on determining the brightness is below the threshold level.

In a fifty-second aspect, in combination with one or more of the forty-second aspect through the fifty-first aspect, the instructions, when executed by a processor of a device, cause the device to perform operations further including determining a video sequence including a first image frame from the first image sensor, a second image frame from the second image sensor, and the corrected image frame. The corrected image frame appears in the video sequence between the first image frame and the second image frame.

In a fifty-third aspect, in combination with one or more of the forty-second aspect through the fifty-second aspect, the step of determining the corrected image frame is further based on an image frame of the other of the first image sensor or the second image sensor.

In a fifty-fourth aspect, alone or in combination with one or more of the forty-second aspect through the fifty-third aspect, the first disparity value indicates a difference in field of view along a first axis.

In a fifty-fifth aspect, in combination with the fifty-fourth aspect, the instructions, when executed by a processor of a device, cause the device to perform operations further including receiving a second disparity value indicating a difference in field of view between the first image sensor and the second image sensor along a second axis different from the first axis. The step of determining the model is further based, at least in part, on the second disparity value.

In a fifty-sixth aspect, alone or in combination with one or more of the forty-second aspect through the fifty-fifth aspect, determining the model includes storing a plurality of disparity values. The model is based on the plurality of disparity values.

In a fifty-seventh aspect, in combination with the fifty-sixth aspect, replacing a previous value of the plurality of disparity values with the first disparity value based on at least one of a number of values in the plurality of disparity values or a time associated with the previous value.

In a fifty-eighth aspect, alone or in combination with one or more of the forty-second aspect through the fifty-seventh aspect, the first depth value includes an auto-focus depth corresponding to a first input image frame captured by the first image sensor.

In a fifty-ninth aspect, alone or in combination with one or more of the forty-second aspect through the fifty-eighth aspect, the instructions, when executed by a processor of a device, cause the device to perform operations further including determining the first depth value based on range imaging.

In a sixtieth aspect, in combination with the fifty-ninth aspect, determining the first depth value includes determining the first depth value based on a time of flight (ToF) measurement.

In a sixty-first aspect, in combination with one or more of the fifty-ninth aspect through the sixtieth aspect, determining the first depth value includes determining the first depth value based on a light detection and ranging (LIDAR) measurement.

In one or more aspects, techniques for supporting image capture may include additional aspects, such as any single aspect or any combination of aspects described below or in connection with one or more other processes or devices described elsewhere herein. In one or more aspects, supporting image capture may include an apparatus configured to a first image sensor configured with a first field of view; a second image sensor configured with a second field of view at least partially overlapping the first field of view; a processor coupled to the first image sensor and coupled to the second image sensor; and a memory coupled to the processor. The apparatus is further configured to perform steps including receiving a first disparity value indicating a difference in field of view between the first image sensor and the second image sensor. The apparatus is further configured to receive a first depth value corresponding to the first disparity value. The apparatus is further configured to determine a model for a disparity between the first image sensor and the second image sensor at a plurality of depth values, the model based, at least in part, on the first disparity value and the first depth. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a sixty-second aspect, the processor is further configured to perform steps including receiving an input image frame from one of the first image sensor or the second image sensor.

In a sixty-third aspect, in combination with the sixty-second aspect, receiving an input image depth corresponding to the input image frame.

In a sixty-fourth aspect, in combination with the sixty-third aspect, determining a predicted disparity value corresponding to the input image depth based, at least in part, on the model.

In a sixty-fifth aspect, in combination with the sixty-fourth aspect, determining a corrected image frame based, at least in part, on the input image frame and the predicted disparity value.

In a sixty-sixth aspect, in combination with one or more of the sixty-second aspect through the sixty-fifth aspect, determining the corrected image frame includes determining, based on the predicted disparity value, a corrected image frame warped to match a field of view of the other of the first image sensor or the second image sensor.

In a sixty-seventh aspect, in combination with the sixty-sixth aspect, determining the corrected image frame includes determining a transformation matrix for the input image frame for warping the input image frame to a field of view of the other of the first image sensor or the second image sensor.

In a sixty-eighth aspect, in combination with the sixty-seventh aspect, determining the transformation matrix includes determining the transformation matrix with computer vision processing (CVP).

In a sixty-ninth aspect, in combination with one or more of the sixty-seventh aspect through the sixty-eighth aspect, 5 the processor is further configured to perform steps including determining whether a confidence level associated with the transformation matrix is below a threshold level. The step of determining the corrected image frame based, at least in part, on the input image frame and the predicted disparity value is performed based on determining the confidence level of the transformation matrix is below the threshold level.

In a seventieth aspect, alone or in combination with one or more of the sixty-second aspect through the sixty-ninth aspect, the processor is further configured to perform steps including determining an image characteristic of the input image frame is below a threshold level. The step of determining the corrected image frame based, at least in part, on the input image frame and the predicted disparity value is performed based on determining the image characteristic is below the threshold level.

In a seventy-first aspect, alone or in combination with one or more of the sixty-second aspect through the seventieth aspect, 5 the processor is further configured to perform steps including determining a brightness of the input image frame is below a threshold level. The step of determining the corrected image frame based, at least in part, on the input image frame and the predicted disparity value is performed based on determining the brightness is below the threshold level.

In a seventy-second aspect, alone or in combination with one or more of the sixty-second aspect through the seventy-first aspect, the processor is further configured to perform steps including determining a video sequence including a first image frame from the first image sensor, a second image frame from the second image sensor, and the corrected image frame. The corrected image frame appears in the video sequence between the first image frame and the second image frame.

In a seventy-third aspect, alone or in combination with one or more of the sixty-second aspect through the seventy-second aspect, the step of determining the corrected image frame is further based on an image frame of the other of the first image sensor or the second image sensor.

In a seventy-fourth aspect, alone or in combination with one or more of the sixty-second aspect through the seventy-third aspect, the first disparity value indicates a difference in field of view along a first axis.

In a seventy-fifth aspect, in combination with the seventy-fourth aspect, the processor is configured to perform steps further including receiving a second disparity value indicating a difference in field of view between the first image sensor and the second image sensor along a second axis different from the first axis. The step of determining the model is further based, at least in part, on the second disparity value.

In a seventy-sixth aspect, alone or in combination with one or more of the sixty-second aspect through the seventy-fifth aspect, determining the model includes storing a plurality of disparity values. The model is based on the plurality of disparity values.

In a seventy-seventh aspect, in combination with the seventy-sixth aspect, replacing a previous value of the plurality of disparity values with the first disparity value based on at least one of a number of values in the plurality of disparity values or a time associated with the previous value.

In a seventy-eighth aspect, alone or in combination with one or more of the sixty-second aspect through the seventy-seventh aspect, the apparatus is configured to a depth sensor. The processor is coupled to the depth sensor and is configured to receive the first depth value from the depth sensor.

In a seventy-ninth aspect, in combination with the seventy-eighth aspect, the depth sensor includes a range imaging system.

In a eightieth aspect, in combination with o the seventy-ninth aspect, the depth sensor includes a time of flight (ToF) system. Determining the first depth value includes determining the first depth value based on a ToF measurement from the ToF system.

In a eighty-first aspect, in combination with one or more of the seventy-ninth aspect through the eightieth aspect, the depth sensor includes a light detection and ranging (LIDAR) system. Determining; the first depth value includes determining the first depth value based on a LIDAR measurement from the LIDAR system.

In a eighty-second aspect, alone or in combination with one or more of the sixty-second aspect through the eighty-first aspect, the apparatus is configured to a computer vision processor (CVP) coupled to the processor and configured to perform operations including receiving a first image frame from the first image sensor; receiving a second image frame from the second image sensor; and feature matching between the first image frame and the second image frame to determine a difference in field of view between the first image sensor and the second image sensor. The processor is configured to receive difference in field of view between the first image sensor and the second image sensor as the first disparity value from the CVP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1, FIG. 2, and FIG. 3 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims. "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving a first disparity value indicating a difference in field of view between a first image sensor and a second image sensor;
   receiving a first depth value corresponding to the first disparity value;
   determining a model for a disparity between the first image sensor and the second image sensor at a plurality of depth values, the model based, at least in part, on the first disparity value and the first depth;
   receiving an input image from one of the first image sensor or the second image sensor;
   receiving a second depth value corresponding to the input image;
   determining a predicted disparity value based on the second depth value and the model;
   determining a transformation matrix for warping the input image to a field of view of the other of the first image sensor or the second image sensor;
   determining a confidence level associated with the transformation matrix is below a threshold level; and
   determining a corrected image frame based on the input image and the predicted disparity value.

2. The method of claim 1, wherein determining the corrected image comprises warped warping the input image received from one of the first image sensor or the second image sensor to match a field of view of the other of the first image sensor or the second image sensor.

3. The method of claim 1, wherein determining the transformation matrix comprises determining the transformation matrix with computer vision processing (CVP).

4. The method of claim 1, further comprising:
   determining an image characteristic of the input image is below a threshold level,
   wherein the step of determining the corrected image is performed based on determining the image characteristic is below the threshold level.

5. The method of claim 1, further comprising:
   determining a brightness of the input image is below a threshold level,
   wherein the step of determining the corrected image is performed based on determining the brightness is below the threshold level.

6. The method of claim 1, further comprising:
   determining a video sequence comprising a first image from the first image sensor, a second image from the second image sensor, and the corrected image, wherein the corrected image appears in the video sequence between the first image and the second image.

7. The method of claim 1, wherein the step of determining the corrected image is further based on an image of the other of the first image sensor or the second image sensor.

8. The method of claim 1, wherein:
   the first disparity value indicates a difference in field, of view along a first axis, and
   the method further comprising:
      receiving a second disparity value indicating a difference in field of view between the first image sensor and the second image sensor along a second axis different from the first axis, wherein the step of determining the model is further based, at least in part, on the second disparity value.

9. The method of claim 1, wherein determining the model comprises:
   storing a plurality of disparity values, wherein the model is based on the plurality of disparity values; and
   replacing a previous value of the plurality of disparity values with the first disparity value based on at least one of a number of values in the plurality of disparity values or a time associated with the previous value.

10. The method of claim 1, wherein the first depth value comprises an auto-focus depth corresponding to the input image.

11. The method of claim 1, further comprising determining the first depth value based on range imaging.

12. The method of claim 11, wherein determining the first depth value comprises determining the first depth value based on a time of flight (ToF) measurement.

13. The method of claim 11, wherein determining the first depth value comprises determining the first depth value based on a light detection and ranging (LIDAR) measurement.

14. A device, comprising:
   one or more processors; and
   a memory coupled to the one or more processors and storing instruction that, when executed by the one or more processors, cause the device to perform operations comprising:
      receiving a first disparity value indicating a difference in field of view between a first image sensor and a second image sensor;
      receiving a first depth value corresponding to the first disparity value;
      determining a model for a disparity between the first image sensor and the second image sensor at a plurality of depth values, the model based, at least, in part, on the first disparity value and the first depth;
      receiving an input image from one of the first image sensor or the second image sensor;
      receiving a second depth value corresponding to the input image;

determining a predicted disparity value based on the second depth value and the model;
determining a transformation matrix for warping the input image to a field of view of the other of the first image sensor or the second image sensor;
determining a confidence level associated with the transformation matrix is below a threshold level; and
determining a corrected image based on the input image and the predicted disparity value.

15. The device of claim 14, wherein determining the corrected image comprises warping the input image received from one of the first image sensor or the second image sensor to match a field of view of the other of the first image sensor or the second image sensor.

16. The device of claim 14, wherein determining the transformation matrix comprises determining the transformation matrix with computer vision processing (CVP).

17. The device of claim 14, wherein the instructions cause the device to perform operations further comprising:
determining an image characteristic of the input image is below a threshold level,
wherein the step of determining the corrected image is performed based on determining the image characteristic is below the threshold level.

18. The device of claim 14, wherein the instructions cause the device to perform operations further comprising:
determining a brightness of the input image is below a threshold level,
wherein the step of determining the corrected image is performed based on determining the brightness is below the threshold level.

19. The device of claim 14, wherein the instructions cause the device to perform operations further comprising:
determining a video sequence comprising a first image from the first image sensor, a second image from the second image sensor, and the corrected image, wherein the corrected image appears in the video sequence between the first image and the second image.

20. The device of claim 14, wherein the step of determining the corrected image is further based on an image of the other of the first image sensor or the second image sensor.

21. The device of claim 14, wherein:
the first disparity value indicates a difference in field of view along a first axis, and
the instructions cause the device to perform operations further comprising:
receiving a second disparity value indicating a difference in field of view between the first image sensor and the second image sensor along a second axis different from the first axis, wherein the step of determining the model is, further based, at least in part, on the second disparity value.

22. The device of claim 14, wherein determining the model comprises:
storing a plurality of disparity values, wherein the model is based on the plurality of disparity values; and
replacing a previous value of the plurality of disparity values with the first disparity value based on at least one of a number of values in the plurality of disparity values or a time associated with the previous value.

23. The device of claim 14, wherein the first depth value comprises an auto-focus depth corresponding to the input image.

24. The device of claim 14, wherein the instructions cause the device to perform operations further comprising determining the first depth value based on range imaging.

25. The device of claim 24, wherein determining the first depth value comprises determining the first depth value based on a time of flight (ToF) measurement.

26. The device of claim 24, wherein determining the first depth value comprises determining the first depth value based on a light detection and ranging (LIDAR) measurement.

27. A non-transitory computer-readable medium storing instructions that, when executed by a processor of a device, cause the device to perform operations comprising:
receiving a first disparity value indicating a difference in field of view between a first image sensor and a second image sensor;
receiving a first depth value corresponding to the first disparity value;
determining a model for a disparity between the first image sensor and the second image sensor at a plurality of depth values, the model based, at least in part, on the first disparity value and the first depth;
receiving an input image from one of the first image sensor or the second image sensor;
receiving a second depth value corresponding to the input image;
determining a predicted disparity value based on the second depth value and the model;
determining a transformation matrix for warping the input image to a field of view of the other of the first image sensor or the second image sensor;
determining a confidence level associated with the transformation matrix is below a threshold level; and
determining a corrected image based on the input image and the predicted disparity value.

28. The non-transitory computer-readable medium of claim 27, wherein determining the corrected image comprises warping the input image received from one of the first image sensor or the second image sensor to match a field of view of the other of the first image sensor or the second image sensor.

29. The non-transitory computer-readable medium of claim 27, wherein determining the transformation matrix comprises determining the transformation matrix with computer vision processing (CVP).

30. The non-transitory computer-readable medium of claim 27, wherein the instructions, when executed by a processor of a device, cause the device to perform operations further comprising:
determining an image characteristic of the input image is below a threshold level,
wherein the step of determining the corrected image is performed based on determining the image characteristic is below the threshold level.

31. The non-transitory computer-readable medium of claim 27, wherein the instructions, when executed by a processor of a device, cause the device to perform operations further comprising:
determining a brightness of the input image is below a threshold level,
wherein the step of determining the corrected image is performed based on determining the brightness is below the threshold level.

32. The non-transitory computer-readable medium of claim 27, wherein the instructions, when executed by a processor of a device, cause the device to perform operations further comprising:
determining a video sequence comprising a first image from the first image sensor, a second image from the second image sensor, and the corrected image, wherein the corrected image appears in the video sequence between the first image and the second image.

33. The non-transitory computer-readable medium of claim 27, wherein the step of determining the corrected image is further based on an image of the other of the first image sensor or the second image sensor.

34. The non-transitory computer-readable medium of claim 27, wherein:
the first disparity value indicates a difference in field of view along a first axis, and
the instructions, when executed by a processor of a device, cause the device to perform operations further comprising:
receiving a second disparity value indicating a difference in field of view between the first image sensor and the second image sensor along a second axis different from the first axis, wherein the step of determining the model is further based, at least in part, on the second disparity value.

35. The non-transitory computer-readable medium of claim 27, wherein determining the model comprises:
storing a plurality of disparity values, wherein the model is based on the plurality of disparity values; and
replacing a previous value of the plurality of disparity values with the first disparity value based on at least one of a number of values in the plurality of disparity values or a time associated with the previous value.

36. The non-transitory computer-readable medium of claim 27, wherein the first depth value comprises an auto-focus depth corresponding to the input image.

37. The non-transitory computer-readable medium of claim 27, wherein the instructions, when executed by a processor of a device, cause the device to perform operations further comprising:
determining the first depth value based on range imaging.

38. The non-transitory computer-readable medium of claim 37, wherein determining the first depth value comprises determining the first depth value based on a time of flight (ToF) measurement.

39. The non-transitory computer-readable medium of claim 37, wherein determining the first depth value comprises determining the first depth value based on a light detection and ranging (LIDAR) measurement.

40. A device, comprising:
a first image sensor configured with a first field of view;
a second image sensor configured with a second field of view at least partially overlapping the first field of view;
one or more processors coupled to the first image sensor and coupled to the second image sensor; and
a memory coupled to the one or more processors,
wherein the one or more processors are configured to perform steps comprising:
receiving a first disparity value indicating a difference in field of view between the first image sensor and the second image sensor;
receiving a first depth value corresponding to the first disparity value;
determining a model for a disparity between the first image sensor and the second image sensor at a plurality of depth values, the model based, at least in part, on the first, disparity value and the first depth;
receiving an input image from one of the first image sensor or the second image sensor;
receiving a second depth value corresponding to the input image;
determining a predicted disparity value based on the second depth value and the model;
determining a transformation matrix for warping the input image to a field of view of the other of the first image sensor or the second image sensor;
determining a confidence level associated with the transformation matrix is below a threshold level; and
determining a corrected image based on the input image and the predicted disparity value.

41. The device of claim 40, wherein determining the corrected image comprises warping the input image received from one of the first image sensor or the second image sensor to match a field of view of the other of the first image sensor or the second image sensor.

42. The device of claim 40, wherein determining the transformation matrix comprises determining the transformation matrix with computer vision processing (CVP).

43. The device of claim 40, wherein the one or more processors are further configured to perform steps comprising:
determining an image characteristic of the input image is below a threshold level,
wherein the step of determining the corrected image is performed based on determining the image characteristic is below the threshold level.

44. The device of claim 40, wherein the one or more processors are further configured to perform steps comprising:
determining a brightness of the input image is below a threshold level,
wherein the step of determining the corrected image is performed based on determining the brightness is below the threshold level.

45. The device of claim 40, wherein the one or more processors are further configured to perform steps comprising:
determining a video sequence comprising a first image from the first image sensor, a second image from the second image sensor, and the corrected image, wherein the corrected image appears in the video sequence between the first image and the second image.

46. The device of claim 40, wherein the step of determining the corrected image is further based on an image of the other of the first image sensor or the second image sensor.

47. The device of claim 40, wherein:
the first disparity value indicates a difference in field of view along a first axis, and
the one or more processors are configured to perform steps further comprising:
receiving a second disparity value indicating a difference in field of view between the first image sensor and the second image sensor along a second axis different from the first axis, wherein the step of determining the model is further based, at least in part, on the second disparity value.

48. The device of claim 40, wherein determining the model comprises:
storing a plurality of disparity values, wherein the model is based on the plurality of disparity values; and
replacing a previous value of the plurality of disparity values with the first disparity value based on at least one of a number of values in the plurality of disparity values or a time associated with the previous value.

49. The device of claim 40, further comprising a depth sensor, wherein the one or more processors are coupled to the depth sensor and is configured to receive the first depth value from the depth sensor.

50. The device of claim 49, wherein the depth sensor comprises a range imaging system.

51. The device of claim 50, wherein the depth sensor comprises a time of flight (ToF) system, and wherein determining the first depth value comprises determining the first depth value based on a ToF measurement from the ToF system.

52. The device of claim 50, wherein the depth sensor comprises a light detection and ranging (LIDAR) system, and wherein determining the first depth value comprises determining the first depth value based on a LIDAR measurement from the LIDAR system.

53. The device of claim 40, further comprising:
a computer vision processor (CVP) coupled to the one or more processors and configured to perform operations comprising:
  receiving a first image frame from the first image sensor;
  receiving a second image frame from the second image sensor; and
  feature matching between the first image frame and the second image frame to determine a difference in field of view between the first image sensor and the second image sensor,
wherein the processor is configured to receive the difference in field of view between the first image sensor and the second image sensor as the first disparity value from the CVP.

* * * * *